Patented Apr. 21, 1953

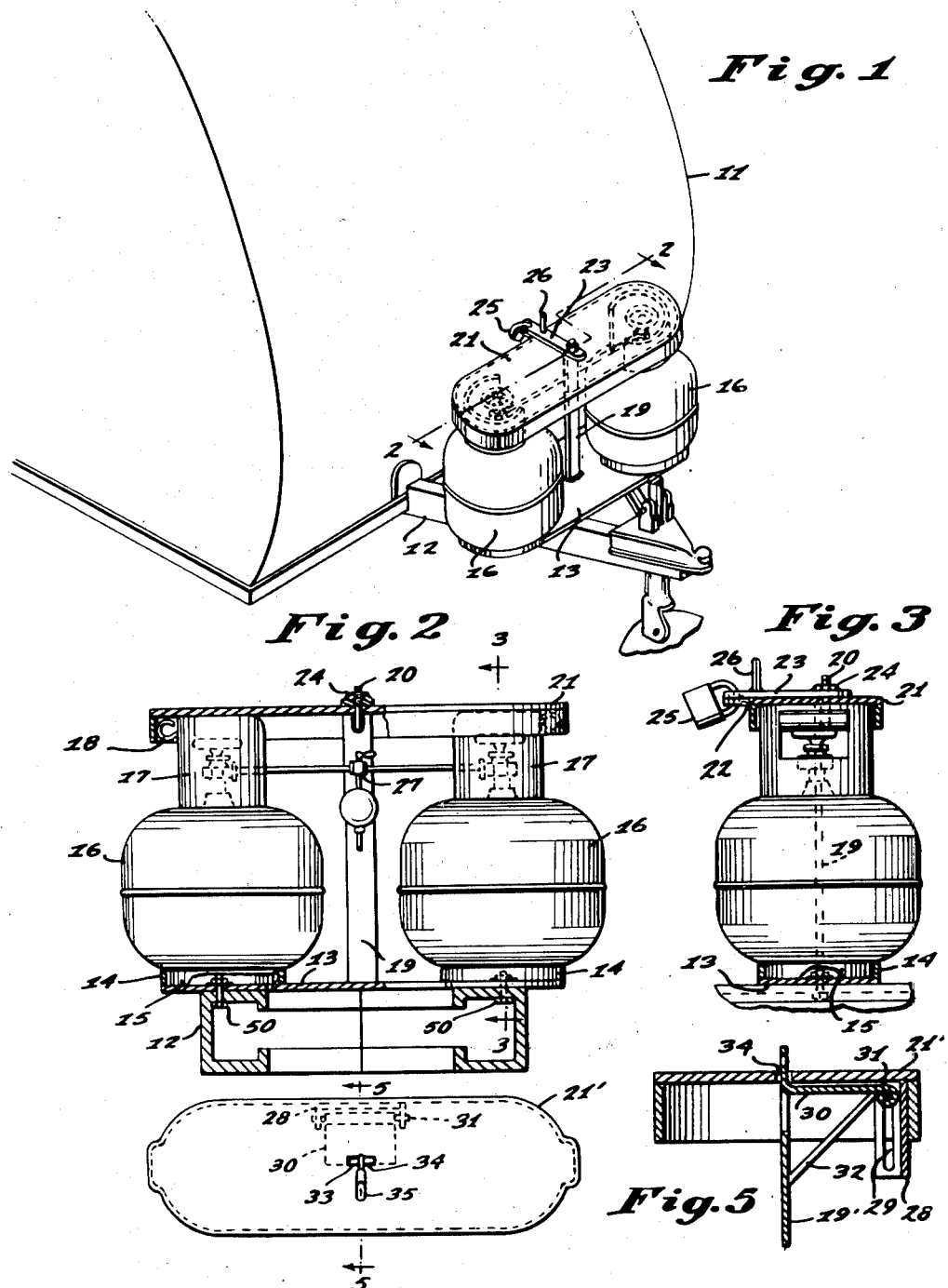

2,635,939

UNITED STATES PATENT OFFICE 2,635,939

GAS BOTTLE RACK FOR TRAILERS

Leo B. Obenchain, Oceanway, Fla.

Substituted for abandoned application Serial No. 27,010, May 14, 1948. This application July 18, 1952, Serial No. 299,667

2 Claims. (Cl. 312—100)

This invention relates to gas bottle supports, and more particularly to gas bottle support of the locked type suitable for use on trailers or in other exposed locations.

A main object of the invention is to provide a novel and improved structure for mounting gas bottles on the forward portion of a trailer coach whereby the control valves thereof are protected from the weather and whereby the bottles are locked in position to prevent theft thereof.

A further object of the invention is to provide an improved support for gas bottles adapted for use on trailers or in other exposed locations, said support being simple in construction, easy to install and providing a substantial degree of protection of the bottles and the control valves therefor against tampering and weather conditions and preventing theft of the bottles.

Further objects and advantages of the invention will become apparent from the following description and claims, and from the accompanying drawings, wherein:

Figure 1 is a perspective view of the forward portion of a trailer coach provided with a gas bottle supporting structure according to the present invention and showing a pair of gas bottles mounted thereon.

Figure 2 is an enlarged vertical cross sectional view taken on line 2—2 of Figure 1.

Figure 3 is a cross sectional view taken on line 3—3 of Figure 2.

Figure 4 is a top plan view of a modified gas bottle supporting structure according to the present invention.

Figure 5 is an enlarged fragmentary cross sectional detail view taken on line 5—5 of Figure 4.

Referring to the drawings, 11 designates a conventional trailer coach having the usual front tongue structure 12. Bolted to the tongue 12 is a horizontal plate member 13 to which are rigidly secured the spaced annular upstanding ring members 14, 14 adapted to receive the annular bottom flanges 15 of a pair of conventional gas bottles 16, 16, as shown in Figures 1 and 2. The gas bottles are provided with the usual top neck portions 17, 17 each having a top handle 18.

Plate member 13 may be secured to the tongue structure 12 by means of conventional bolts 50 or by any other suitable fastening means such as hook bolts engaging the respective channels of the tongue structure. The bolt holes in plate member 13 serve as drainage openings to allow rain water and the like to freely escape from the space within the annular ring members 14, 14.

Secured to the plate member 13 intermediate the ring members 14, 14 is an upstanding vertical bar member 19 to the top end of which is welded or otherwise rigidly secured an upstanding threaded stud 20. Overlying the bottle neck portions 17, 17 is a flanged top cover member 21 having an aperture through which stud 20 projects. Cover member 21 is provided at its rear intermediate marginal portion with an apertured horizontal lug 22. Designated at 23 is a flat bar member which is apertured at each end. At one end the bar member has a nut 24 welded thereto over the aperture, which is threaded onto the stud 20. The aperture at the other end of the bar member 23 registers with lug 22 and is locked thereto by a suitable padlock 25. Bar member 23 is provided with an upstanding handle lug 26 which serves as a handle in threading the bar member onto the stud 20.

In mounting the bottles 16, 16, they are first positioned with their annular bottom flanges received in ring members 14, 14, and the usual conduit connections are made to the bottles. The selecting valve for the bottles is shown at 27. After the bottles are connected to the gas line, cover member 21 is placed thereover, the stud 20 projecting through the aperture in said cover member. Bar member 23 is then threaded onto the stud and is rotated until plate member 21 is securely engaged with the top rims of the neck portions 17, 17. The free end of bar member 23 is then brought into alignment with lug 22 and the padlock 25 is engaged therewith.

It will be seen that the valve 27 is covered by the cover member 21 and is substantially protected against the weather. Furthermore, it is impossible to remove cover member 21 without removing padlock 25. The bottles 16, 16 therefore cannot be removed since they are held in position by the bottom ring members 14, 14 and the depending flange of the cover member 21.

In the embodiment of Figures 4 and 5, the top cover member is designated at 21' and has secured to the inside surface of its rear depending flange portion a vertical channel bracket 28, each side flange of said bracket being formed with a vertical slot 29. Secured to the bottom plate is a vertical upstanding bar member 19' formed adjacent its top and with a rearwardly extending horizontal arm 30. The end of arm 30 is received between the flanges of bracket 28 and secured to said end is a transverse pin member 31 whose ends are slidably received in the vertical slots 29 of said flanges. A diagonal brace bar 32 connects the end of arm 30 with bar 10', increasing the rigidity of said arm with respect to said bar. The top end of arm 19' is provided with an upstanding apertured tab 33 which projects through a slot 34 formed in cover member 21'. To lock the cover member 21' against upward movement, the hasp of a suitable padlock 35 may be engaged in the aperture of tab 33, as shown in Figure 4. To lift the cover member, padlock 35 is removed and the cover member may then be raised, the slots 29 allowing the cover member to be raised sufficiently to release the depending peripheral flange of said cover member from engagement with the top neck portions of the gas bottles mounted on the bottom plate of the structure.

While certain specific embodiments of a gas bottle supporting structure for trailer coaches and the like have been disclosed in the foregoing description, it will be understood that various modifications within the spirit of the invention may occur to those skilled in the art. Therefore, it is intended that no limitations be placed on the invention except as defined by the scope of the appended claims.

This application is a substitute of application Serial No. 27,010, filed May 14, 1948, now forfeited, Gas Bottle Rack for Trailer.

What is claimed is:

1. A support for gas bottles comprising a base plate, a plurality of respective ring members secured to said base plate adapted to receive the base flanges of the respective gas bottles, a vertical upstanding bar member secured to said base plate, a cover member provided with a depending peripheral flange, said cover member being adapted to be placed over the top ends of the neck portions of the bottles positioned in said ring members, and being formed with an opening, a threaded stud carried at the top end of said bar member and projecting through said opening, a flat bar threaded on said stud, and means for locking said flat bar to said cover member.

2. A support for gas bottles comprising a base plate, a plurality of respective ring members secured to said base plate adapted to receive the base flanges of the respective gas bottles, a vertical upstanding bar member secured to said base plate, a cover member provided with a depending peripheral flange, said cover member being adapted to be placed over the top ends of the neck portions of the bottles positioned in said ring members and being formed with an opening, a threaded stud carried at the top end of said bar member and projecting through said opening, a horizontal flat bar threaded on said stud, said bar being formed with an aperture, and a horizontal apertured lug carried by said cover member, the bar being movable into overlying position on said lug and the bar aperture being registrable with the aperture of said lug.

LEO B. OBENCHAIN.

References Cited in the file of this patent

UNITED STATES PATENTS

| Number | Name | Date |
| --- | --- | --- |
| 1,543,743 | Ballard | June 18, 1925 |
| 1,698,489 | Bickford | Jan. 8, 1929 |
| 2,084,231 | Watkins | June 15, 1937 |
| 2,166,043 | Double | July 11, 1939 |
| 2,171,110 | Feicht | Aug. 29, 1939 |
| 2,172,310 | Thomas | Sept. 5, 1939 |
| 2,245,873 | Ritz-Woller | June 17, 1941 |
| 2,271,702 | McCartney | Feb. 3, 1942 |
| 2,278,232 | Anderson | Mar. 31, 1943 |
| 2,337,960 | Anderson | Dec. 28, 1943 |
| 2,567,370 | Fauser | Sept. 11, 1951 |